United States Patent [19]

Lia

[11] Patent Number: 4,953,505
[45] Date of Patent: Sep. 4, 1990

[54] SAFETY DEVICE FOR CHICKS IN AUTOMATIC POULTRY FEEDERS

[75] Inventor: Peder Lia, Hvittingfoss, Norway

[73] Assignee: Modum Stiger a.s., Vikersund, Norway

[21] Appl. No.: 304,647

[22] Filed: Feb. 1, 1989

[30] Foreign Application Priority Data

Feb. 1, 1988 [NO] Norway ........................ 880424

[51] Int. Cl.⁵ ............................................ A01K 39/014
[52] U.S. Cl. ............................... 119/57.2; 119/57.7; 198/716; 198/735.1
[58] Field of Search ............... 119/51.01, 57.92, 57.2, 119/57.7; 198/719, 728, 716, 735, 729

[56] References Cited

U.S. PATENT DOCUMENTS

| | | | |
|---|---|---|---|
| 2,866,536 | 12/1958 | Hegan | 198/735 |
| 3,077,182 | 2/1963 | Jordan | 119/57.2 |
| 3,250,250 | 5/1966 | Woock | 119/57.2 |
| 3,272,400 | 9/1966 | Van Huis | 119/57.2 |
| 3,285,230 | 11/1966 | Van Huis et al. | 119/51.01 |
| 4,351,273 | 9/1982 | Holland et al. | 119/51 R |

FOREIGN PATENT DOCUMENTS 999251 11/1976 Canada ........................ 119/57.7

*Primary Examiner*—John Weiss
*Attorney, Agent, or Firm*—Wenderoth, Lind & Ponack

[57] ABSTRACT

A safety device (6), particularly for chicks in automatic poultry feeders with feed troughs (10), in which a feed chain (5) runs in an endless loop. The safety device is designed for placing in those sections of the poultry feeder where the feed chain (5) enters a device such as a feed machine or a corner piece (12), or if one is provided, a food cleaner. The safety device (6) comprises a down-stream roller (1) relative to the direction of travel (R) of the feed chain (5), and an up-stream roller (2). The down-stream roller (1) is driven by the feed chain (5) and transmits, in turn, rotation to the up-stream roller (2), for the purpose of ejecting any chicks up and out of the feed troughs (10).

15 Claims, 1 Drawing Sheet

SAFETY DEVICE FOR CHICKS IN AUTOMATIC POULTRY FEEDERS

BACKGROUND OF THE INVENTION

1. Field of the Invention

This invention relates to a safety device for chicks in automatic poultry feeders with feed troughs, designed for mounting in those positions where a feed chain runs into a feed machine, or where the chain makes a turn.

2. Description of the Prior Art

For rearing chickens or broilers on a large scale, automatic feed troughs are used which dispense the food and spread it out. For this, use is made of feed troughs in which there runs a feed chain which carries with it the food into the trough. The feed chain runs in a closed loop, for example of rectangular shape, in which the chain, in several places, changes direction. In these places the chain will be guided by an idler or a chain sprocket. It is here that the trouble arises because the chicks, especially those less than four weeks old, have been drawn by the chain into the mechanism where the chain changes direction. The same problem occurs where the chain runs into the machine which dispenses food onto the chain, and also at the entrance to a food cleaner, in those installations equipped with these.

Devices are already known to prevent the chicks from being injured or killed in the above-mentioned places. U.S. Pat. No. 3250250 discloses a safety device of this type placed in the positions in question. This device comprises a flexible or resilient hoop which is activated continuously by the links in the feed chain. U.S. Pat. No. 3285230 shows a similar safety arrangement with a release arm and an ejector arm. In similarity with U.S. Pat. No. 3250250, the mechanism of U.S. Pat. No. 3285230 is also operated by the links in the chain. U.S. Pat. No. 3077182 discloses another protective device, which is based on pivotable tines which form a grid for diverting possible chicks. U.S. Pat. No. 4351273 is based on a similar design as in U.S. Pat. No. 3077182, but with a very special configuration of protective grid.

As already mentioned, it is particularly the newly-hatched chicks which cause the problem as they jump into the feed trough and are drawn along by the feed chain. When they do this, they have a tendency to carry with them sawdust and wood chips out into the trough and, in the case of arrangements known hitherto, this has resulted in the piling up of food and chips at the safety device, forming a barrier for the further transportation of the food in the trough. As a result, only minimal quantities are carried further in the pits in the feed chain. The material which piles up at the safety device can grow rapidly and spill out over the edges of the feed trough. The earlier solutions, particularly the first two mentioned above have, on account of their activating mechanisms and rapid agitation, resulted in noise which admittedly has frightened off the chicks, but the rigid and plate-like structure of these devices has made it possible for the larger chickens to get their feet caught up and crushed.

SUMMARY OF THE INVENTION

The safety device according to the invention aims at furnishing an arrangement which completely prevents the chicks from entering the mechanisms for changing the direction of the feed chain, from entering the feed machine or, if one is provided, a food cleaner.

This is achieved by a safety device characterized in that it comprises two rollers in contact with one another, the one behind the other. The down-stream roller is driven by the feed chain, and it transfers rotation to the up-stream roller, the purpose being to impart to the up-stream roller rotation which will eject any chicks on the feed chain up and out of the feed trough.

One or both of the rollers can expediently have on its circumference teeth or raised portions which correspond with the length of the links in the chain.

The rollers can, with advantage, be connected with one another through a common unit in which they have their bearings, with the result that this unit, with the rollers, can be placed onto, and removed from, the feed troughs. It is also advantageous to design this common unit in such a manner that it forms a cover over the rollers or at least, over vital parts of the rollers to prevent the chicks from being drawn in between the rollers.

The safety device can be built in such a manner that it stays in position on the feed trough by its own weight, or it can be equipped with a simple fixture means to keep it in place. Such fixture means could involve a strap, belt, rubber band or a snap-on arrangement in connection with the trough.

As already mentioned, the problem of the birds being drawn into the feed machine or the mechanisms for changing the direction of the chain, applies particularly to chicks up to the age of three to four weeks. After that, the safety device can be removed from the trough until a new brood of chicks is to be reared.

BRIEF DESCRIPTION OF THE DRAWINGS

Other objects, features and advantages of the invention will be apparent from the following description of a preferred embodiment of the invention given in connection with the attached drawings, in which.

DESCRIPTION OF THE PREFERRED EMBODIMENTS

Figure 1:
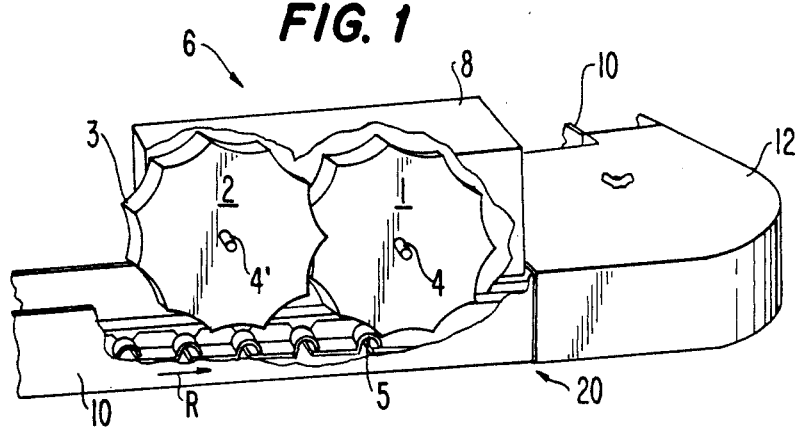
FIG. 1 shows in a broken-away perspective a part of an automatic poultry feeder, equipped with a safety device according to the invention.

In FIG. 1, a safety device 6 is shown placed on a section 20 of an automatic poultry feeder, more precisely at a corner 12. The automatic feeder consists of feed troughs 10 and a feed chain 5 which runs in trough 10. The chain 5 is supplied with food by a feed machine which dispenses the food onto the chain 5. By means of chain 5, the food is drawn out into the trough 10 and distributed as the chain travels along the trough 10. The feed chain 5 can be operated at suitable intervals of time, adjusted to suit the feeding of the birds which are being reared.

Feed chain 5 is driven by a motor (not shown) and runs in an endless loop, which may be square, rectangular or, in fact, any polygon. At those places where chain 5 changes direction, there are corner pieces 12, in which the chain is guided by means of sprockets (not shown).

The safety device 6 can be placed as shown in FIG. 1 on a feed trough 10 at the entrance to a corner piece 12 in order to prevent birds being carried by chain 5 into the corner piece 12. The safety device is also used at the entrance to the feed machine and, if one is provided, at the entrance to a food cleaner.

The safety device 6 consists of two rollers 1, 2, the one placed behind the other with respect to the direction of travel R of the feed chain 5. The down-stream roller 1 is so disposed that it engages with the chain 5, with the result that roller 1 rotates. The up-stream roller 2 engages with the down-stream roller 1, which in turn results in rotation of the up-stream roller 2. Up-stream roller 2 will thus rotate in the opposite direction to that of roller 1. It is pointed out that the up-stream roller 2 does not come into contact with chain 5. FIG. 1 also shows a cover 8 which screens roller 1 and 3 to prevent any birds from being drawn in between rollers 1, 2. Rollers 1, 2 are disposed centrally with respective shaft journals 4, 4' suspended in the cover 8. In an embodiment which does not have the cover 8, the shaft journals 4, 4' have their bearings disposed in brackets (not shown) fixed to trough 10. In the embodiment shown, the rollers 1, 2 have raised parts, or teeth 3, which engage with one another, whilst the teeth 3 on the downstream roller also mesh with the feed chain 5. This embodiment has proven to be expedient also with respect to "ejecting" chicks out of trough 10. Rollers 1, 2 can however have grooves in their circumferences or, in fact, any pattern capable of transmitting drive from feed chain 5 to the down-stream roller 1 and then over to the up-stream roller 2. It would be fully possible for the safety device to operate as intended merely by simple friction transmission between the feed chain 5 and the down-stream roller 1, and between the down-stream roller 1 and the up-stream roller 2.

Rollers 1, 2 can be made of any suitable material, for example a plastic. As may be clearly seen from FIG. 3, the down-stream roller 1 is narrower that the up-stream roller 2. Although not perhaps necessary, this has proven to be advantageous, particularly with respect to the conveyance of a given quantity of food through the troughs 10. For this purpose, the up-stream roller 2 is positioned sufficiently high enough above the chain 5 to permit the passage of food.

Figure 3:
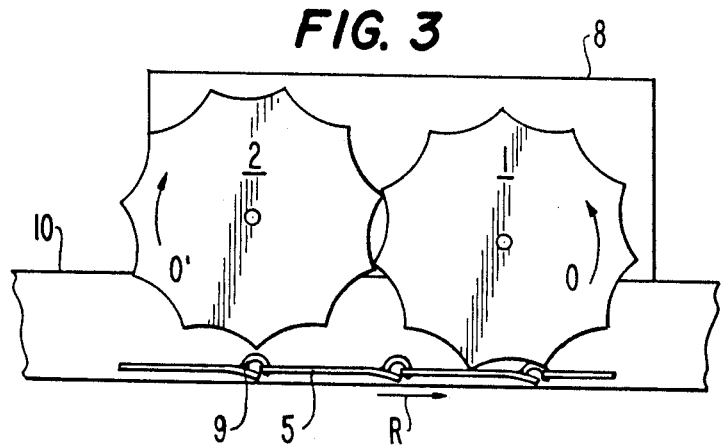
FIG. 3 shows the safety device seen from the front.

In FIG. 3, cover 8 is shown with fixing means 7 which provide a squeezing or snap hold against the food trough 10. Alternatively, cover 8 can merely lie against trough 10, being held in position by means of a strap or the like. With a simple fixture means of this nature, the whole safety device can be readily removed from trough 10 when the birds have reached the size where they no longer jump up into the feed trough 10.

Figure 2:
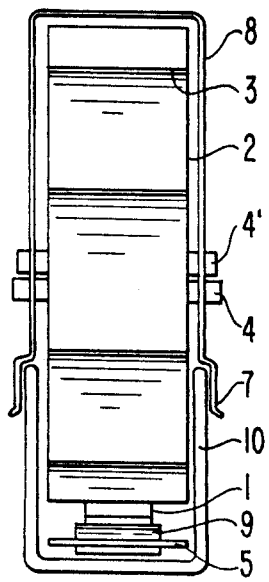
FIG. 2 shows a side view of the safety device according to the invention.

As will be seen from FIGS. 2 and 3, in this embodiment, the links 9 of the feed chain 5 are used to drive the rollers 1, 2. FIG. 2 shows the direction of travel R of the feed chain, which in turn results in the rotation of the down-stream roller 1 in the direction indicated by the arrow 0 which in turn transmits rotation to the upstream roller 2 in the direction of the arrow 0'. It can thus be seen how the up-stream roller 2 will, at any time, eject any chicks sitting on the feed-chain 5. This will prevent the chicks from entering the corner pieces 12, whilst at the same time, food in sufficient quantities can pass.

I claim:

1. A safety device for chicks in an automatic poultry feeder, said automatic poultry feeder having a feed trough and a feed chain for movement in said feed trough, said safety device comprising:
   a downstream roller;
   an upstream roller positioned upstream of said downstream roller with respect to the direction of travel of said feed chain;
   means for supporting said rollers such that said rollers are in contact with one another and such that said downstream roller can be driven by said feed chain, whereby movement of said feed chain drives said downstream roller and said downstream roller drives said upstream roller so that the upstream roller can eject any chick on said feed chain.

2. The safety device as set forth in claim 1, wherein: said downstream roller is narrower in width than said upstream roller with respect to the direction of the axes of rotation of said rollers.

3. The safety device as set forth in claim 2, wherein: both said rollers have teeth on their circumferences.

4. The safety device as set forth in claim 3, wherein: said feed chain comprises a plurality of chain links; and
said teeth of said rollers are spaced about said rollers at distances corresponding to the length of said links of said feed chain.

5. The safety device as set forth in claim 2, wherein: said means for supporting said rollers comprises a common unit, said common unit having rotatable bearing means for rotatably bearing said rollers such that said rollers are rotatable relative to said common unit.

6. The safety device as set forth in claim 2, wherein: said means for supporting said rollers comprises a common unit, said common unit comprising a cover for said rollers.

7. The safety device as set forth in claim 1, wherein: said means for supporting said rollers comprises a common unit, said common unit having rotatable bearing means for rotatably bearing said rollers such that said rollers are rotatable relative to said common unit.

8. The safety device as set forth in claim 7, wherein: said common unit comprises a cover for said rollers.

9. The safety device as set forth in claim 7, wherein: said common unit comprises means for removably mounting said common unit on said feed trough.

10. The safety device as set forth in claim 9, wherein: said means for removably mounting comprises at least one strap.

11. The safety device as set forth in claim 9, wherein: said means for removably mounting comprises at least one fastener.

12. The safety device as set forth in claim 1, wherein: both said rollers have teeth on their circumference.

13. The safety device as set forth in claim 12, wherein: said feed chain comprises a plurality of chain links; and
said teeth of said rollers are spaced about said rollers at distances corresponding to the length of said links of said feed chain.

14. The safety device as set forth in claim 13, wherein: said means for supporting said rollers comprises a common unit, said common unit having rotatable bearing means for rotatably bearing said rollers such that said rollers are rotatable relative to said common unit.

15. The safety device as set forth in claim 14, wherein: said common unit comprises means for removably mounting said common unit on said fee through.

* * * * *